Oct. 26, 1937.    H. R. BUTLER    2,096,880
RECTIFIER STARTING SYSTEM
Filed May 13, 1936
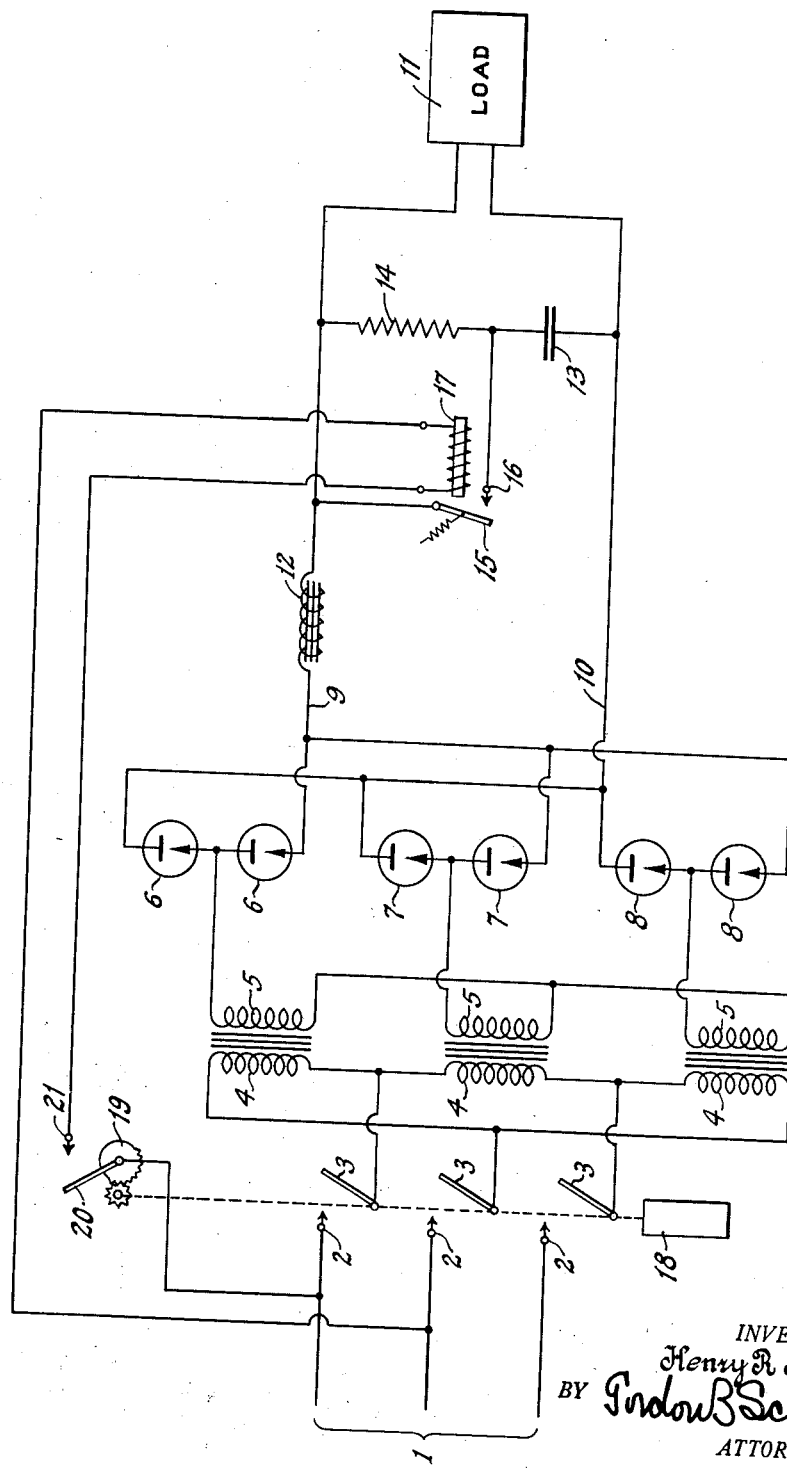
INVENTOR.
Henry R. Butler
BY Gordon B Scheibell
ATTORNEY.

Patented Oct. 26, 1937

2,096,880

UNITED STATES PATENT OFFICE 2,096,880

RECTIFIER STARTING SYSTEM

Henry R. Butler, Verona, N. J., assignor to Wired Radio, Inc., New York, N. Y., a corporation of Delaware Application May 13, 1936, Serial No. 79,524

4 Claims. (Cl. 175—363)

This invention pertains in general to starting systems for rectifiers and specifically relates to means for preventing surge short circuiting effects in such systems.

The principal object of the invention consists in providing a rectifier system employing a smoothing circuit together with means for preventing surges in said circuit upon the initiation of operation of the rectifier system.

A further object of the invention consists in producing an electron tube rectifier system having a filter circuit employing a capacitor, together with means for controlling the charge of said capacitor to prevent short circuiting effects.

These and other desirable objects will be apparent from the following, reference being had to the accompanying drawing which is a diagrammatic representation of one embodiment of the rectifier starting system of my invention.

The invention contemplates the provision of a multiple electron tube rectification system employing a smoothing circuit in the form of a filter having a capacitor connected therein. In initiating the operation of such a rectifier system, the sudden application of voltage to the anodes of the rectifier tubes tends to produce a momentary surge caused by the sudden charging of the capacitor so that the capacitor becomes, in effect, a short circuit of the rectifier output, thereby vitiating its intended effect and operating to the detriment of the electron rectifier tubes. According to the present invention, means are provided for controlling the current supply to this capacitor until the normal operation of the rectifier system is attained, whereupon automatically operative means restores the circuits of the capacitor to a normal condition so as to eliminate the function of the surge controlling means.

In carrying out the invention, a controlling resistor is connected in circuit with the filter capacitor, and means in the form of a relay are provided to short circuit this resistor at a predetermined time when the normal action of the rectifier system has been attained. This relay is connected with a slow acting contactor operative at a predetermined time after the closing of the principal power circuit to the rectifier system.

Referring to the drawing in detail, the lines I supply three phase alternating current to the terminals 2. The terminals 2 are engageable by contacting armatures 3, so that the lines I effectively connect with the primary windings 4 of a three-phase power transformer. The secondary windings 5 of this power transformer are respectively connected with rectifier tubes 6, 7, and 8, as shown.

The output circuit for the electron rectifier tubes 6, 7, and 8 includes connections 9 and 10 directed to the load circuit 11. A smoothing filter arrangement is provided in this output circuit and includes an inductive reactance in the form of a choke coil 12, in series in the connection 9, and a capacitive reactance in the form of a capacitor 13 connected across the lines 9 and 10.

In accordance with the invention, a resistor 14 is connected in series, as shown, with the capacitor 13. This resistor 14 is of a value such as to retard the charging rate of the condenser 13 to an appreciable extent so as to eliminate short circuiting surges. The armature 15 and contact 16 are connected in shunt with the resistor 14 so that, when in contact they will short circuit the resistor 14. An electromagnet 17 is provided to actuate the armature 15 which is suitably mounted in operating position with respect to the contact terminal 16.

The armatures 3 are adapted to be actuated by an electromagnet 18 which may be energized by any suitable control circuit. The solenoid 18 also serves to operate a timing mechanism 19 which actuates an armature 20 to engage a contact terminal 21 at a predetermined interval after the contact armatures 3 have been brought into engagement with the contact terminals 2. The timing unit 19 comprises means known in the art and, for example, may be a commercially available unit such as General Electric Company's Type #2953—3A.

In the operation of the rectifier starting system, the solenoid 18 is energized whereupon the three phase alternating current is supplied through the three-phase transformer to the electron rectifier tubes 6, 7, and 8. The normally expected current surge is controlled by the resistance 14 to prevent short circuiting effect of the capacitor 13. After a suitable delay, and when the rectifier tubes assume a normal operation condition, the armature 20 is closed, whereupon the electromagnet 17 is energized through the circuit leading to the lines I, as shown. Thereupon, the contact armature 15 is closed so as to short circuit the resistor 14 and eliminate its current controlling effect until such time as the rectifier unit may be shut down or the current armatures 3 opened.

Although a preferred form of rectifier starting system has been disclosed, it will be realized that various changes and equivalent structures can be produced without departing from the intended scope of my invention. I do not, therefore, desire to limit myself to the foregoing except as may be pointed out in the appended claims.

What I claim as new and original and desire to secure by Letters Patent of the United States is:

1. A rectifier starting system comprising an alternating current input circuit, a power transformer, a circuit controller connected between said input circuit and said transformer, a plurality of electron tube rectifiers connected with the output of said transformer, an output circuit for said rectifier tubes including a filter arrangement having a capacitor, a current controlling resistor connected in series with said capacitor, a cut-out circuit for said resistor, and a relay for rendering said cut-out circuit effective at a predetermined time after the operation of said circuit controller to supply alternating current to said rectifier tubes, said resistor operating to prevent an initial input surge with respect to said capacitor, and said relay operating to eliminate the effect of said resistor when said electron tubes attain a normal condition of current supply.

2. A rectifier starting system having an electron tube circuit, a smoothing filter connected in said circuit and including a reactance, current controlling means connected in said circuit and including a resistor for controlling current in said circuit directed to said reactance, means for initiating the operation of said rectifier system and means controlled by said means for initiating the operation of said rectifier system for initiating the operation of said current controlling means at a predetermined time after the operation of said means for initiating the operation of said rectifier.

3. The system in accordance with claim 2 in which said means for initiating the operation of said rectifier system includes a circuit controller and in which said current controlling means comprises a resistor and means for short-circuiting said resistor a predetermined time interval after the operation of said circuit controller.

4. The system in accordance with claim 2 in which said reactance comprises a capacitor and in which said current controlling means comprises a resistor in circuit therewith, said last mentioned control means including a delayed operating device for short-circuiting said resistor a predetermined time interval after the initiation of operation of said rectifier system.

HENRY R. BUTLER.